United States Patent
Goater

(10) Patent No.: US 7,713,018 B2
(45) Date of Patent: May 11, 2010

(54) BOTTOM BOARD SEPARATOR

(76) Inventor: George H. Goater, 7491 Crawford Drive, Delta, BC (CA) V4C 6X8

( * ) Notice: Subject to any disclaimer, the term of this patent is extended or adjusted under 35 U.S.C. 154(b) by 895 days.

(21) Appl. No.: 11/536,608

(22) Filed: Sep. 28, 2006

(65) Prior Publication Data
US 2008/0078653 A1 Apr. 3, 2008

(51) Int. Cl.
*B65H 3/24* (2006.01)
(52) U.S. Cl. .................. 414/797.9; 414/795.8
(58) Field of Classification Search ..............................
198/370.02–370.09, 371.3, 456, 782, 786,
198/890, 890.1; 221/268, 270, 281; 414/795.8,
414/796.8, 797.4, 797.6–797.9, 798, 798.7–798.8
See application file for complete search history.

(56) References Cited
U.S. PATENT DOCUMENTS

| | | | | |
|---|---|---|---|---|
| 3,096,891 A | * | 7/1963 | Verrinder et al. | 414/790.1 |
| 3,289,861 A | * | 12/1966 | Carle et al. | 414/795.6 |
| 3,870,167 A | * | 3/1975 | Werner | 414/796 |
| 4,637,508 A | * | 1/1987 | Kikuchi et al. | 198/890.1 |
| 4,658,947 A | * | 4/1987 | Welder | 198/346.2 |
| 4,717,011 A | * | 1/1988 | Yu et al. | 198/370.02 |
| 4,896,760 A | * | 1/1990 | Triantafilou et al. | 198/370.02 |
| 4,907,942 A | * | 3/1990 | Pfeil | 414/798 |
| 5,026,250 A | * | 6/1991 | Hofer | 414/796.1 |
| 5,573,368 A | * | 11/1996 | Freudelsperger | 414/795.8 |

* cited by examiner

*Primary Examiner*—Gregory W Adams
(74) *Attorney, Agent, or Firm*—Oyen Wiggs Green & Mutala LLP

(57) ABSTRACT

A bottom board separator can remove the bottom board from a stack of lumber moving at process speed. The bottom board separator carries stacks of lumber on a first set of stack conveyors that are spaced apart along a path. Abutment surfaces push the bottom board transversely out from under the stack. A second set of stack conveyors follow the abutment surface and support the remaining part of the stack. Movable guides keep the remaining part of the stack traveling in the process direction.

18 Claims, 17 Drawing Sheets

BOTTOM BOARD SEPARATOR

TECHNICAL FIELD

This invention relates to lumber handling and to lumber handling equipment. The application relates in particular to apparatus and methods for removing a bottom board from a stack of lumber. The invention has application, for example, in sawmills.

BACKGROUND

The lumber business is increasingly competitive. Whether or not a sawmill can be operated profitably usually depends on maintaining high efficiencies. There is pressure on sawmill operators to make the most efficient use of every log processed as well as to maintain a high throughput. Modern sawmills are extensively automated. This is necessary because both logs and labour are major cost components in manufacturing lumber.

In sawmills it can be desirable to remove a board from the bottom of a stack of lumber. An example of this need occurs where a vertical arbor gang saw is used to cut a cant into boards.

Logs are typically made into rough green lumber by processes that include producing a cant by cutting boards or flitches from the outside of the logs. This is typically done after profile-scanning the log to determine the optimum planes along which the log should be cut to make the most efficient use of the wood in the log. The cant is then cut into boards by a vertical arbor gang saw. Depending upon the size of the log and the nature of boards that are desired, side boards may be cut from the cant before the cant is passed to the vertical arbor gang saw.

The top, bottom and side faces of a cant may not be completely planar. Wane can occur along the corners of the cant. Where this happens, one or more of the corners of the cant are not square along part or all of the length of the cant. The shape of the top and bottom of the cant, and therefore the shape of the top and bottom boards sawn by the vertical arbor gang saw are typically determined by the optimization process.

The vertical arbor gang saw cuts the cant into a stack of boards. The vertical arbor gang saw typically has multiple blades equally spaced-apart along a vertical arbor. The vertical arbor gang saw may have a plurality of arbors. The width of the gaps between the blades determines the thickness of boards cut from the cant. The bottom of the cant becomes the bottom surface of the bottom board. The top of the cant becomes the top surface of the top board. Where the corners of the cant have wane, one or both of the top and bottom boards may need to be re-edged to yield narrower boards having square edges. Re-edging is performed in a separate re-edging apparatus.

Stacks of lumber emerge from the vertical arbor gang saw at process speeds which may be approximately 500 feet/minute, or even faster. Top and bottom boards that need re-edging are typically sorted and separated from a stack of lumber manually. Manual sorting is time-consuming and expensive in terms of labour costs. Providing an area for manual sorting can take up space within a sawmill.

There exist devices capable of removing top boards from stacks of lumber. Such top board separators are not able to remove bottom boards.

There is a need for apparatus and methods for removing bottom boards from a stack of lumber. There is a particular need for such apparatus and methods that can remove the bottom board while the stack of lumber is moving downstream for further processing without interrupting movement of the stack of boards.

SUMMARY

This invention provides methods and apparatus for removing boards (or other elongated objects) from the bottom of a stack of boards (or other elongated objects) while the stack is in motion.

One aspect of the invention provides apparatus for separating a bottom board from a moving stack of boards. The apparatus comprises a plurality of first board conveyors having moving upper surfaces disposed to carry a stack of boards along a path. The apparatus also comprises a plurality of second board conveyors each located in a gap between two of the first board conveyors. Each of the second board conveyors has an abutment surface on one end thereof and a board-carrying surface elevated above the moving upper surfaces of the first board conveyors. One or more actuators are coupled to move the second board conveyors between first positions wherein the second board conveyors are outside of the path on a first side of the path and second positions wherein the second board conveyors are in the path.

Another aspect of the invention provides a method for removing a bottom board from a moving stack of boards. The method comprises moving the stack of boards along a path defined by a plurality of first board conveyors. While the stack is supported by the first board conveyors, the method advances abutment surfaces transversely across the path to engage and push a bottom one of the boards out from under the stack. In gaps between the first board conveyors, the method advances second board conveyors to support a remaining part of the stack. The remaining part of the stack may be supported by a wall while the bottom board is pushed out from under the stack by the abutment surfaces, the bottom board may pass under a lower edge of the wall.

Further aspects of the invention and features of specific embodiments of the invention are described below and illustrated in the accompanying drawings.

BRIEF DESCRIPTION OF DRAWINGS

Exemplary embodiments are illustrated in the appended drawings. The embodiments and figures disclosed herein are to be considered illustrative rather than restrictive.

FIGS. 3 to 13 are all schematic views of a particular bottom board separator. FIG. 3 is a top view of the particular bottom board separator.

FIG. 4 is a side elevation of the particular bottom board separator from the discharge side.

In FIG. 5A a separating roll is shown in its retracted position. In FIG. 5B the separating roll is shown approximately half way through its stroke. In FIG. 5C the separating roll is shown in its extended position.

FIG. 6 is a transverse cross section in the plane 6-6 indicated in FIG. 3 showing a fixed roll.

FIG. 7 is a transverse cross section in the plane 7-7 indicated in FIG. 3 showing guide wheels for various moving components.

FIG. 8 is a transverse cross section in the plane 8-8 indicated in FIG. 3 showing actuators for various moving components.

FIG. 9 is a longitudinal cross section in the plane 9-9 indicated in FIG. 3 showing rolls, movable stop and outer guide surface.

FIG. 10 is a longitudinal cross section in the plane 10-10 indicated in FIG. 3 showing separating rolls and flanged rollers.

FIG. 11 is a longitudinal cross section in the plane 11-11 indicated in FIG. 3 showing a flexible chain drive for driving rotation of separation rolls.

FIG. 13 is a schematic control diagram showing connections of a controller to sensors and actuators.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
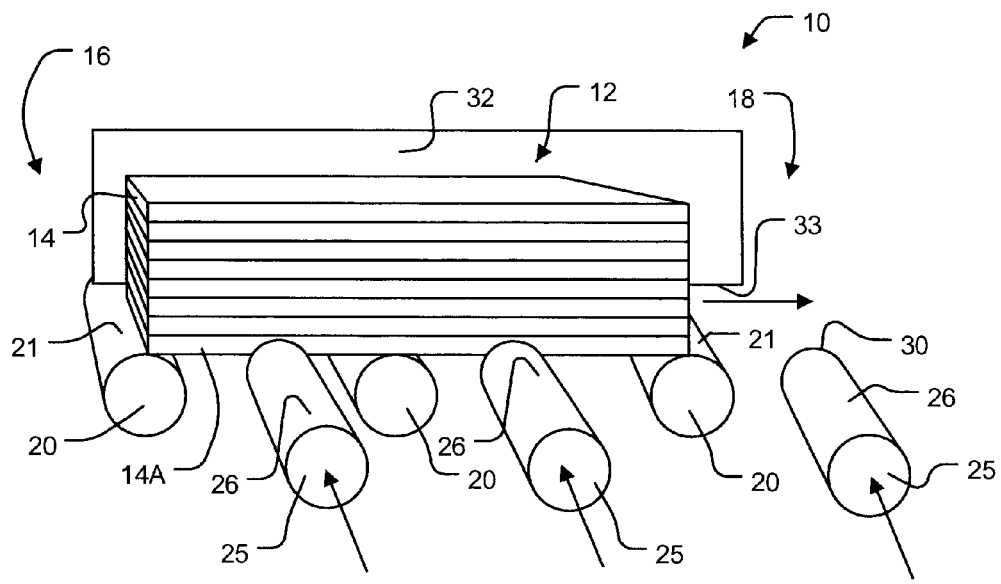
FIG. 1 is a schematic isometric view of a bottom board separator.

FIG. 1 shows a bottom board separator 10. Separator 10 receives stacks 12 of boards 14 at an upstream end 16, separates bottom boards 14A from selected stacks 12, and passes the rest of the stacks 12 out a downstream end 18 for further processing.

Figure 1A:
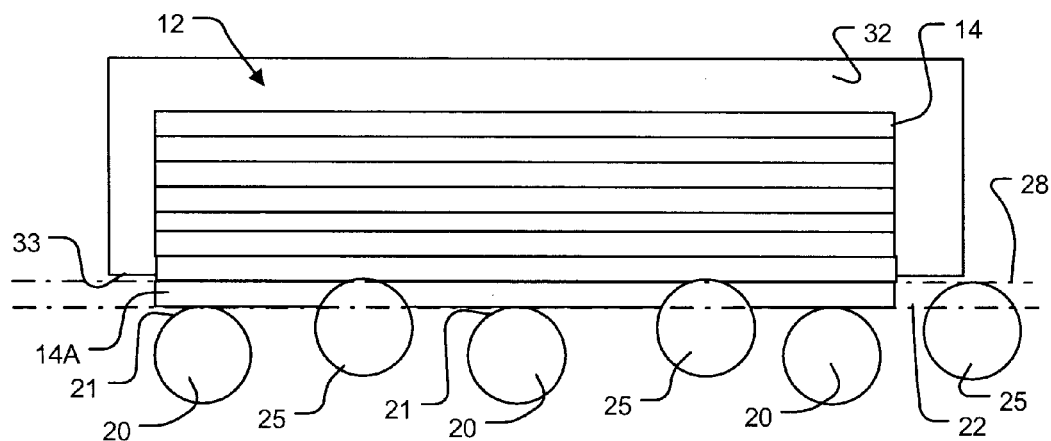
FIG. 1A is a schematic front elevation view of a bottom board separator.

Separator 10 comprises a plurality of first stack conveyors 20 that are spaced apart from one another along the direction of motion of stacks 12. Each stack conveyor 20 has a moving upper surface 21 that supports stacks 12 as they pass over the stack conveyor 20. Stack conveyors 20 support the bottom of each stack 12 at a datum level 22 (see FIG. 1A).

In the illustrated embodiment, first stack conveyors 20 comprise rollers. The rollers may be driven in rotation to keep stacks moving downstream along a path 24 (see FIG. 2A) at a desired rate. First stack conveyors 20 may comprise the rollers of a conventional fixed position rollcase driven at process speeds. First stack conveyors 20 are closely enough spaced that the shortest stacks 12 are carried reliably through separator 10. For example, in a sawmill where the shortest expected stacks of lumber are 8 feet long, first stack conveyors 20 may be approximately 3 feet apart.

Separator 10 comprises a plurality of second stack conveyors 25. Second stack conveyors 25 have moving upper surfaces 26 that are higher than upper surfaces 21 of first stack conveyors 20. Second stack conveyors 25 are capable of supporting a stack 12 with its bottom at a level 28 that is higher than datum level 22 by a vertical distance that is approximately equal to a thickness of bottom board 14A.

When it is not desired to separate a bottom board 14A from a stack 12, second stack conveyors 25 are located beside, but out of, path 24 taken by the stacks 12 as they move through apparatus 10. Second stack conveyors 25 are movable in a direction that is transverse to path 24 so that they can be moved across path 24. Each second stack conveyor 25 has an abutment surface 30 on its end toward path 24.

In the illustrated embodiment, second stack conveyors 25 comprise rollers mounted to carriages that can be moved transversely by means of suitable actuators (not shown in FIG. 1) to sweep abutment surfaces 30 of second stack conveyors 25 across path 24. The rollers of the second stack conveyors 25 are preferably driven in rotation to provide a surface speed of moving upper surfaces 26 equal to the process speed.

Figure 2A:
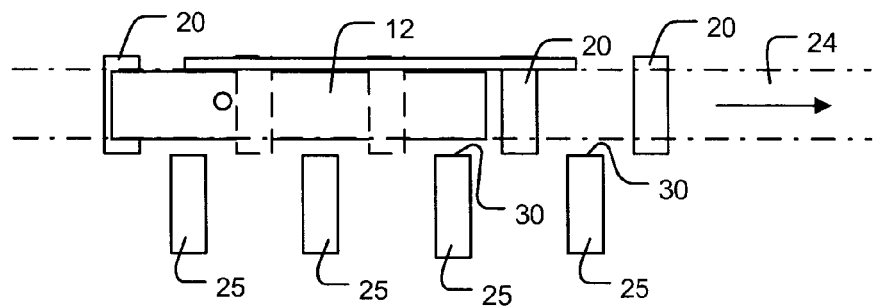
FIGS. 2A through 2D are schematic top plan views showing phases in the operating cycle of a bottom board separator removing a bottom board from a stack of boards.
Figure 2B:
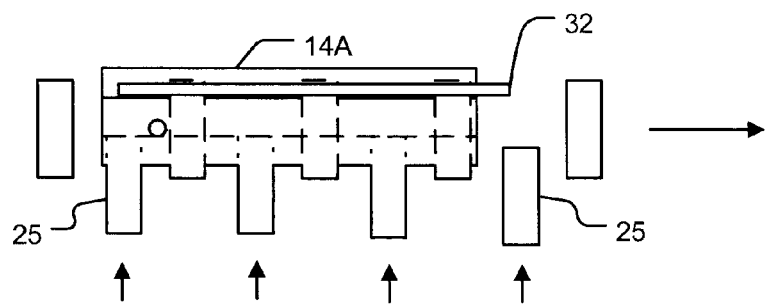

A controller coordinates the operation of separator 10. The operation of separator 10 is illustrated in FIGS. 2A through 2D. When it is desired to separate a bottom board 14A from a stack 12, the controller determines when the stack 12 has been received in separator 10 adjacent to second stack conveyors 25, as shown in FIG. 2A.

When the stack is adjacent to second stack conveyors 25, the controller operates actuators to advance second stack conveyors 25 into stack 12. As shown best in FIG. 1A, second stack conveyors 25 are higher than first stack conveyors 20. Therefore, abutment surfaces 30 on the ends of second stack conveyors 25 contact the edge of bottom board 14A.

Figure 2C:
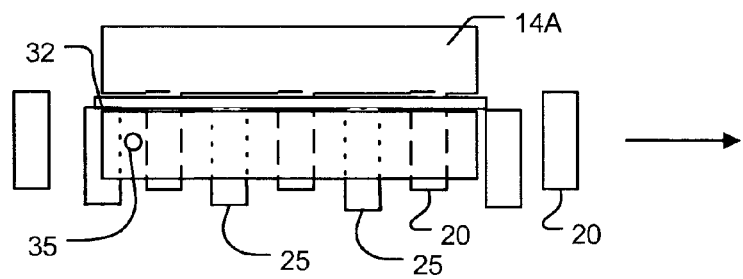
Figure 2D:
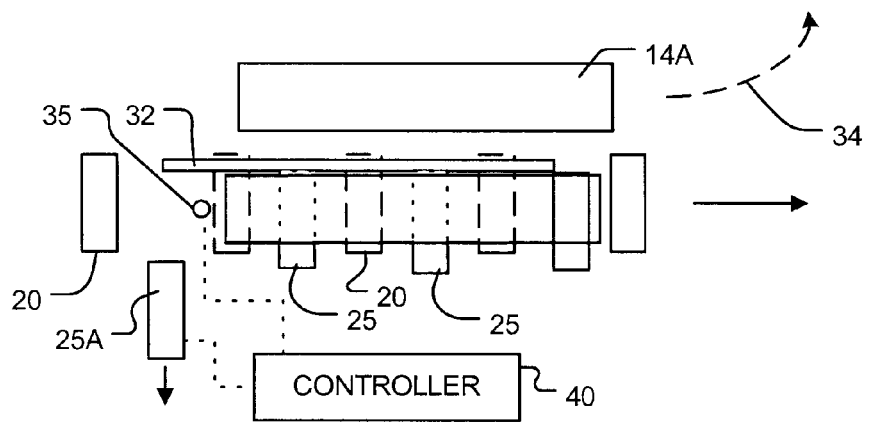
Figure 3:
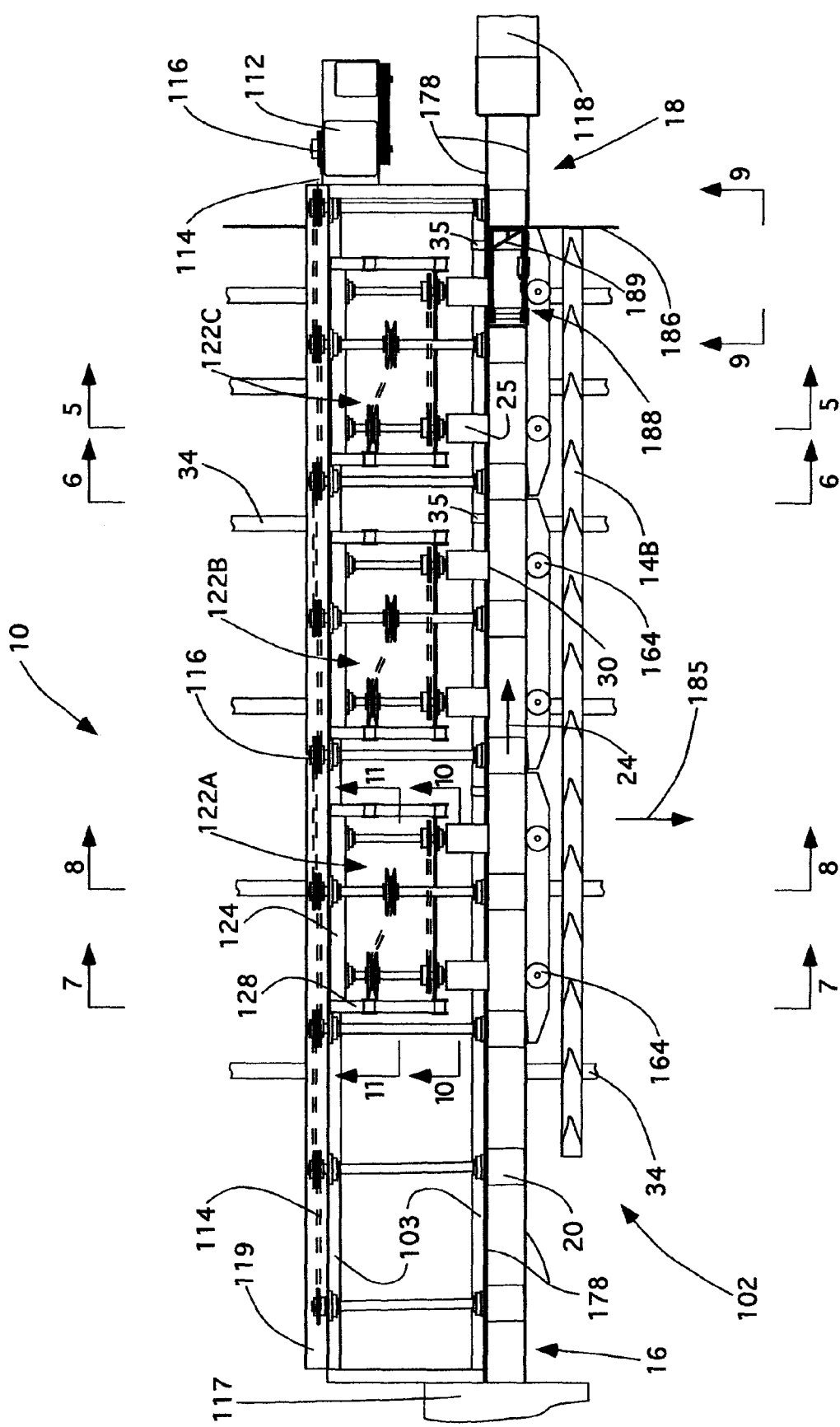
Figure 4:
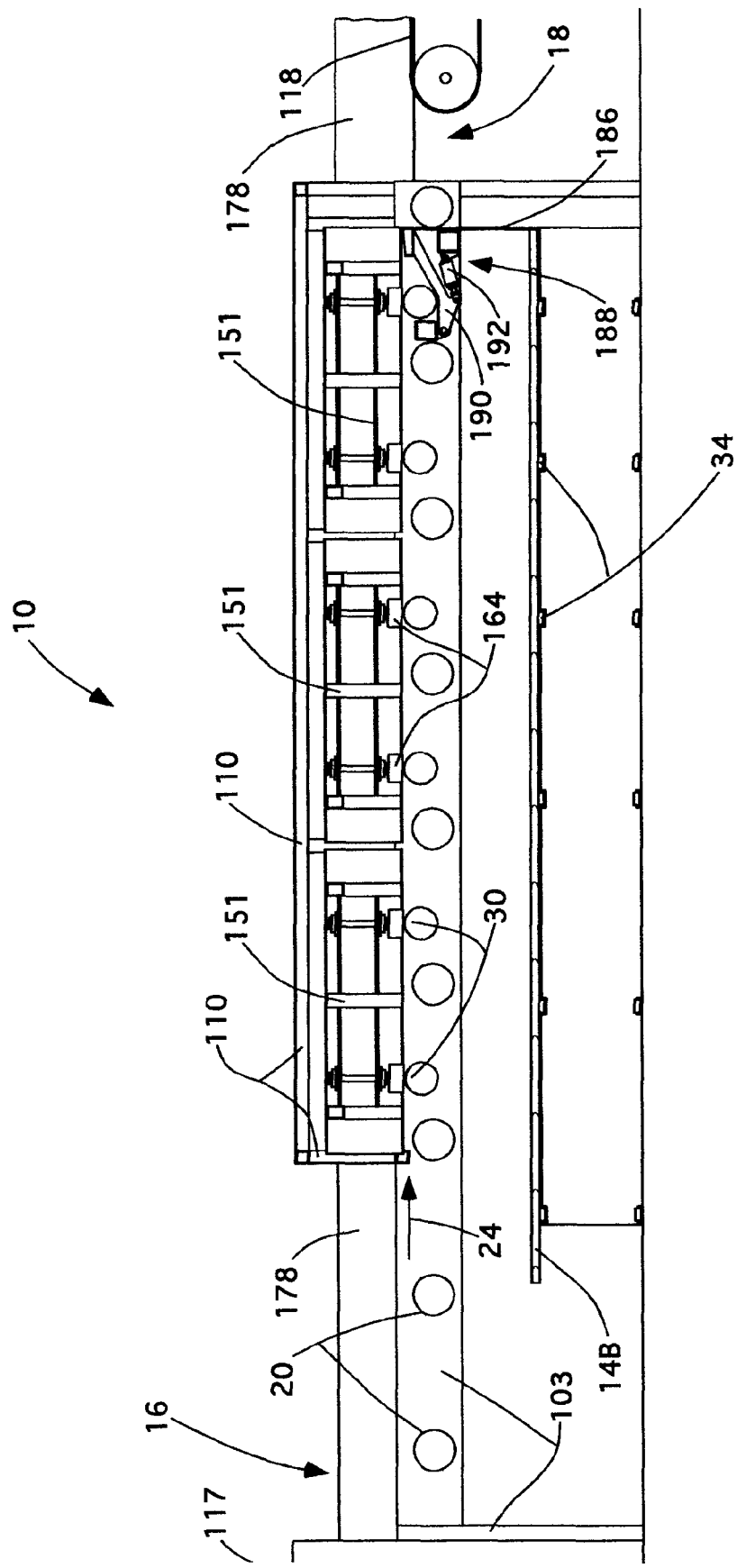

A guide surface 32 extends along path 24 in its portion adjacent to second stack conveyors 25. Guide surface 32 prevents stack 12 from being pushed sideways by abutment surfaces 30. A lower edge 33 of guide surface 32 is spaced above datum 22 by a distance slightly greater than the thickness of bottom board 14A. Therefore, as shown in FIG. 2C, abutment surfaces 30 can push bottom board 14A out from under stack 12 as they advance across path 24. Eventually, second stack conveyors 25 advance far enough that abutment surfaces 30 push bottom board 14A completely out from under stack 12 as shown in FIG. 2D.

Guide surface 32 may optionally comprise rollers to reduce friction between the stack and guide surface 32 when the upper part of a stack 12 is pushed against the guide surface 32. As described below in more detail, guide surfaces may be provided on both sides of path 24. The guide surfaces may be controlled by actuators which move the guide surfaces toward and away from the center of path 24. When a stack 12 is passing through apparatus 10 for which the bottom board does not need to be removed then the guide surfaces can remain retracted so that they do not interfere with passage of the stack along first stack conveyors 20. When it is necessary to remove a bottom board 14A from a stack 12, the guide surfaces can be advanced so that the stack 12 is confined between the two guide surfaces and is thereby held against the forces exerted as the bottom board 14A is pushed out from under the rest of the stack 12.

A conveyor 34 may be provided to carry the separated bottom boards 14A away for further processing. For example, the conveyor may carry the separated bottom boards to an edger. A bumper or end stop may optionally be provided to stop bottom board 14A with its leading end at a known location to facilitate downstream processing.

As second stack conveyors 25 advance they begin to support stack 12 on moving support surfaces 26. Since support surfaces 26 are moving at the same speed as stack 12 the motion of stack 12 along path 24 is not interrupted by the removal of bottom board 14A.

In the illustrated embodiment, second stack conveyors 25 are not all constrained to be advanced or retracted together. Instead, the controller can separately control segments, each comprising one, two or more second stack conveyors 25. This permits each segment of second stack conveyors 25 to be retracted to clear path 24 for the next stack 12 as soon as the current stack 12 has passed the segment. FIG. 2D shows a stack detector 35, which may comprise a photocell/light source combination, for example. A controller 40 monitors stack detector 35 to determine when the stack 12 has passed. Upon detecting that the stack has passed, the controller operates an actuator to retract second stack conveyor 25A. A similar control system including a photocell switch or other stack detector may operate each segment of second stack conveyors 25.

It can be seen that the basic mode of operation of bottom board separator 10 is to push bottom board 14A sideways out from under stack 12 while stack 12 is moving. Concurrently, second stack conveyors are slid under the stack 12 to support the portion of the stack that is no longer supported by bottom board 14A. The second stack conveyors support the remaining part of the stack at substantially the same height as the top surface of bottom board 14A and permit the remainder of the stack to continue moving at process speed.

Several variations in the construction and operation of the bottom board separator are possible. For example:

- It is not mandatory that the abutment surfaces 30 be on the same devices that provide moving upper surfaces 26. One could provide abutment surfaces to push the bottom board 14A out from under a stack 12 on arms or the like that are separate from the rollers or other devices that provide moving upper surfaces 26.
- It is not necessary that all of first stack conveyors 20 or second stack conveyors 25 be driven. Some of the stack conveyors could comprise idler rollers that are turned by contact with the moving stack 12.

FIGS. 1 to 13 show a bottom board separator 10 according to a specific embodiment of the invention. Bottom board separator 10 comprises a first fixed rollcase 102 comprising a frame 103 supporting a plurality of shafts 104. Shafts 104 are supported by bearings 105 for rotation relative to frame 103. Each shaft carries a driven roll 20. A drive unit 112 drives rotation of shafts 104 by way of a drive chain 114 that engages drive sprockets 116 on shafts 104.

Driven rolls 20 can carry stacks 12 of boards 14 from a vertical arbor gang saw 117 to a take-away belt conveyor 118 along a path in the direction indicated by arrow 24.

Bottom board separator 10 has a second rollcase that includes movable driven rolls 25. The second rollcase has three segments, 122A, 122B and 122C (collectively segments 122). Each segment 122 comprises a support frame 124 that is carried by flanged rollers 126 by transversely-extending rails 128. Each segment includes an actuator 130 that can move frame 124 transversely relative to path 24 along rails 128. Flanged rollers 126 absorb side loads placed on frame 124 during the operation of bottom board separator 10.

Each driven roll 25 of the second rollcase is mounted on a shaft 132 that is supported by bearings 133. In each segment, a first one of shafts 132 is driven from an adjacent shaft 104 of fixed rollcase 102 by a flexible roller chain drive 134. Each drive 134 comprises a drive sprocket 135, a driven sprocket 136 and a chain 137. Guides 140, which may be made from a low-friction material such as an ultra high molecular weight (UHMW) plastic prevent the chain from coming off of the sprockets as frame 124 is moved back and forth along tracks 128.

The second one of shafts 132 in each segment is driven from the first one of shafts 132 by way of a chain drive 144 comprising a drive sprocket 146 a driven sprocket 147 and a chain 148.

Actuators 130 may be operated to move the corresponding support frame 124 in a direction that is transverse to path 24. Actuators 130 have a range of motion sufficient to move the corresponding frame 124 from a first position in which the corresponding rolls 25 are entirely clear of path 24 to a second position in which end surfaces 30 are at least substantially even with end surfaces of rolls 20.

As described above in relation to FIG. 1, the tops 26 of the rolls 25 of the second rollcase are higher than the tops 21 of rolls 20 of fixed rollcase 102 by approximately the thickness of one board. It is generally desirable that the tops of rolls 25 be spaced above the tops of rolls 20 by very slightly more than the thickness of bottom boards 14A so that rolls 25 tend to lift the rest of stacks 12 slightly as rolls 25 are pushed across path 24. This reduces friction between a bottom board 14A being separated from a stack 12 and the rest of a stack 12 from which the bottom board is being separated.

The outer ends 121 of rolls 25 may be slightly tapered to provide a lead in so that rolls 25 can slide under the rest of stacks 12. End surfaces 30 of rolls 25 provide abutment surfaces that can bear on the edges of bottom boards 14A to separate the bottom boards from an overlying stack 12. Abutment surfaces 30 are at an elevation above top surfaces 21 of rolls 20 that is less than the thickness of bottom boards 14A so that abutment surfaces 30 do not damage the board above bottom board 14A as they pass under it.

Bottom board separator 10 may have provision for adjusting the height of rolls 25 to accommodate bottom boards of different thicknesses and to fine tune the operation of bottom board separator 10.

Bottom board separator 10 has a pair of guide surfaces, one on either side of path 24. Both of the guide surfaces are movable toward and away from the center of path 24. An outside guide surface 32 is disposed on a frame 151 that is supported by bars 152 which extend over path 24. Bars 152 are at an elevation high enough that they do not interfere with stacks 12. A lower edge 33 of outer guide surface 32 is spaced above the rolls 20 of fixed rollcase 102 by a distance slightly greater than a thickness of bottom boards 14A but less than a thickness of two boards.

Bars 152 ride in flanged rollers 158. Actuators 160 control the position of outside guide surface 32 in transverse direction 161. Actuators 160 have a range of motion sufficient to move outside guide surface 32 substantially out of path 24 or to bring outside guide surface 32 into proximity with stacks 12 being carried along path 24.

Outside guide surface 32 carries rollers 164 that are mounted on shafts 166 supported for rotation by bearings 167.

Inside guide surface 170 is disposed on a frame 171 that is carried on bars 152 by flanged rollers 172. The position of inside guide surface 170 relative to path 24 is controlled by actuators 176. Inside guide surface 170 can be retracted until it is substantially out of path 24 or advanced to be in close proximity to a stack 12 of boards passing along path 24. Actuators 160 and 176 can position inside and outside guide surfaces to be located close to the faces of passing stacks. Actuators 160 and 176 can move inside and outside guide surfaces 170 and 32 to accommodate stacks having different widths.

A separately controllable pair of inside and outside guide surfaces 170 and 32 are provided for each segment 122.

Stack detectors 35 are provided at locations that are spaced apart along path 24. Stack detectors 35 are located in positions such that a controller can determine by monitoring signals from stack detectors 35 when the leading end of a stack is entering a segment 122 and when the trailing end of a stack has left a segment 122. Stack detectors 35 may comprise photocell switches, for example, but any practical sensor or system of sensors capable of determining whether a stack 12 is in a segment or has left the segment may be used for stack detectors 35.

A transfer 34 for separated boards is provided on the outside of path 24. Transfer 34 moves separated boards away from path 24 in direction 185. A bumper plate 186 along one edge of transfer 34 maintains alignment of ends of separated bottom boards 14A.

A movable end stop 188 presents an angled surface 189. End stop 188 can be moved between a disengaged position in which it lies below the upper surfaces 21 of rolls 20 (and therefore cannot contact any boards of passing stacks 12 to an engaged position wherein it projects above upper surfaces 21 of rolls 20 but is no higher than upper surfaces 26 of rolls 25. In the illustrated embodiment, movable stop 188 is mounted to an arm 190 that is pivotally attached to frame 103 of fixed rollcase 102. An actuator 192 coupled to arm 190 can move end stop 188 between its engaged and disengaged positions.

Figure 5A:
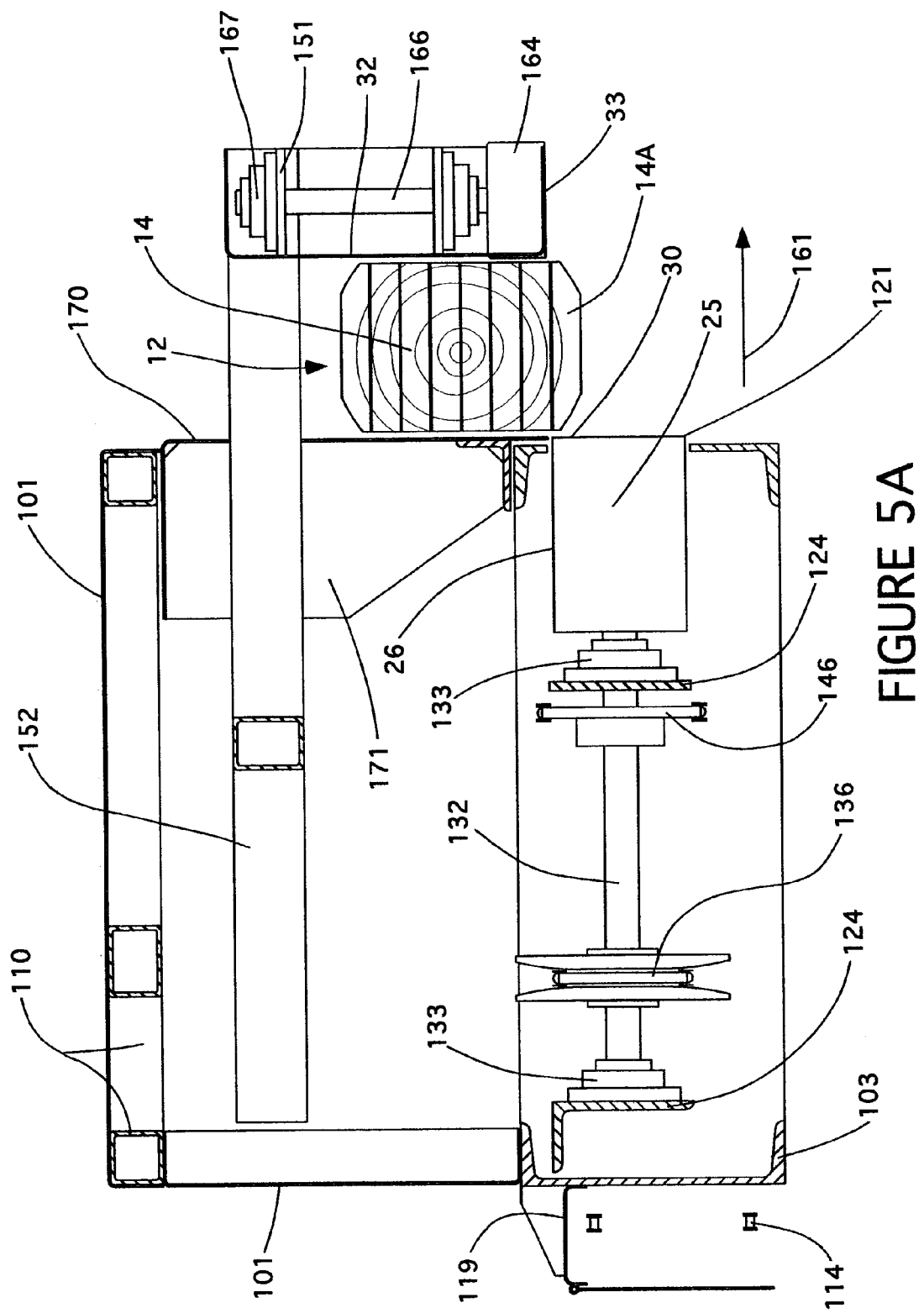
FIGS. 5A, 5B and 5C are transverse elevational cross sections of the particular bottom board separator on the plane 5-5 indicated in FIG. 3.
Figure 5B:
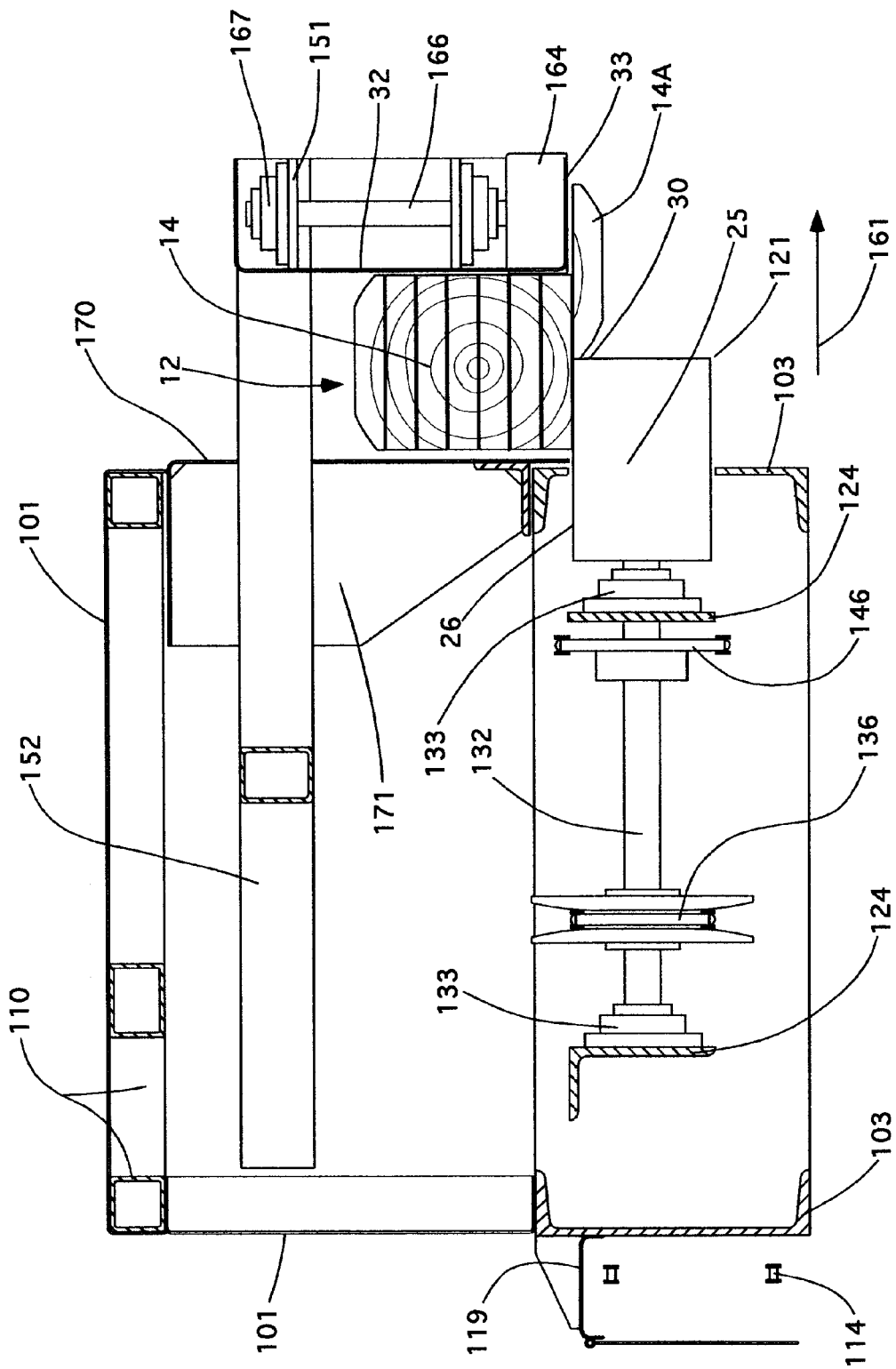
Figure 5C:
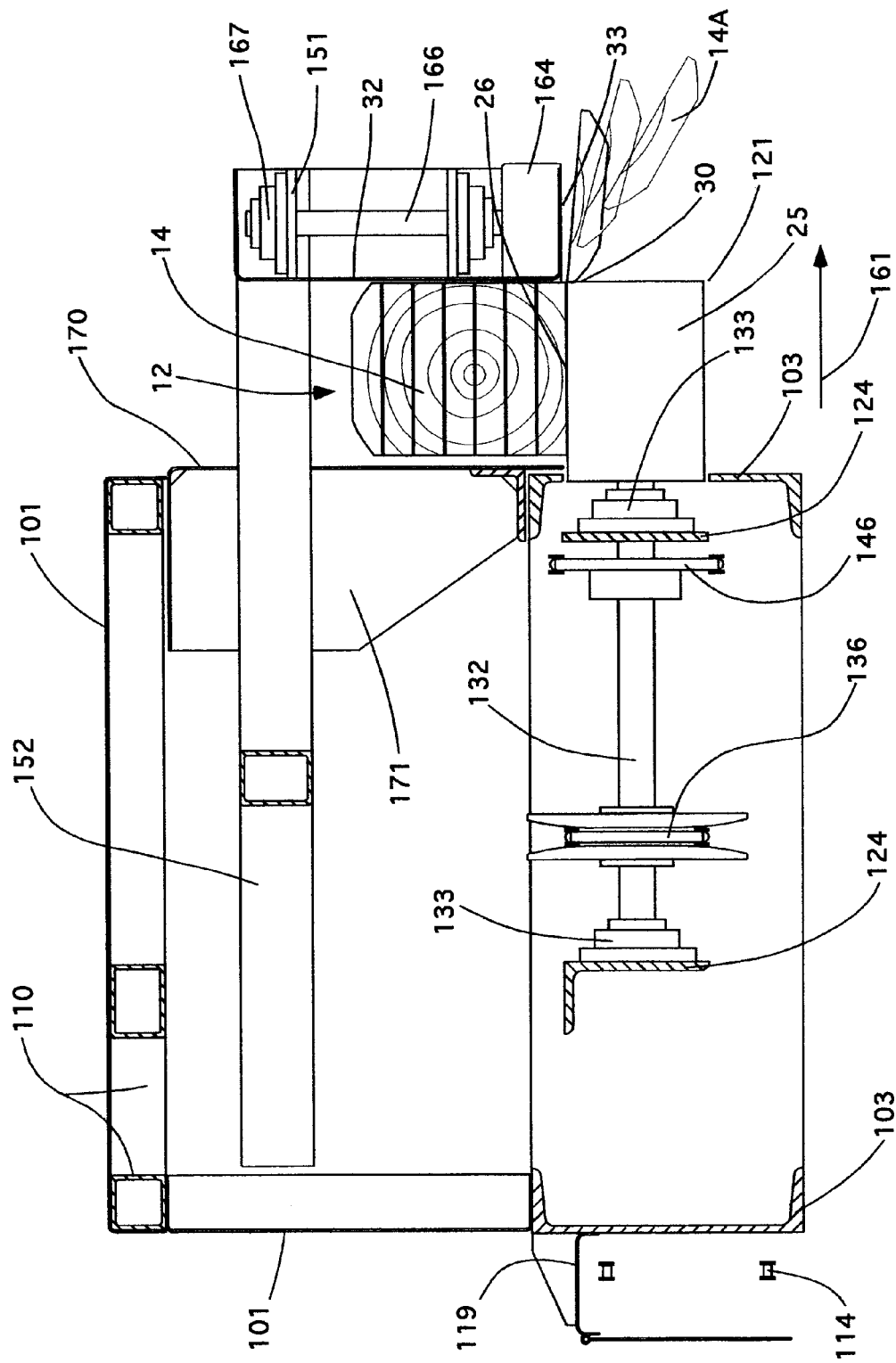
Figure 6:
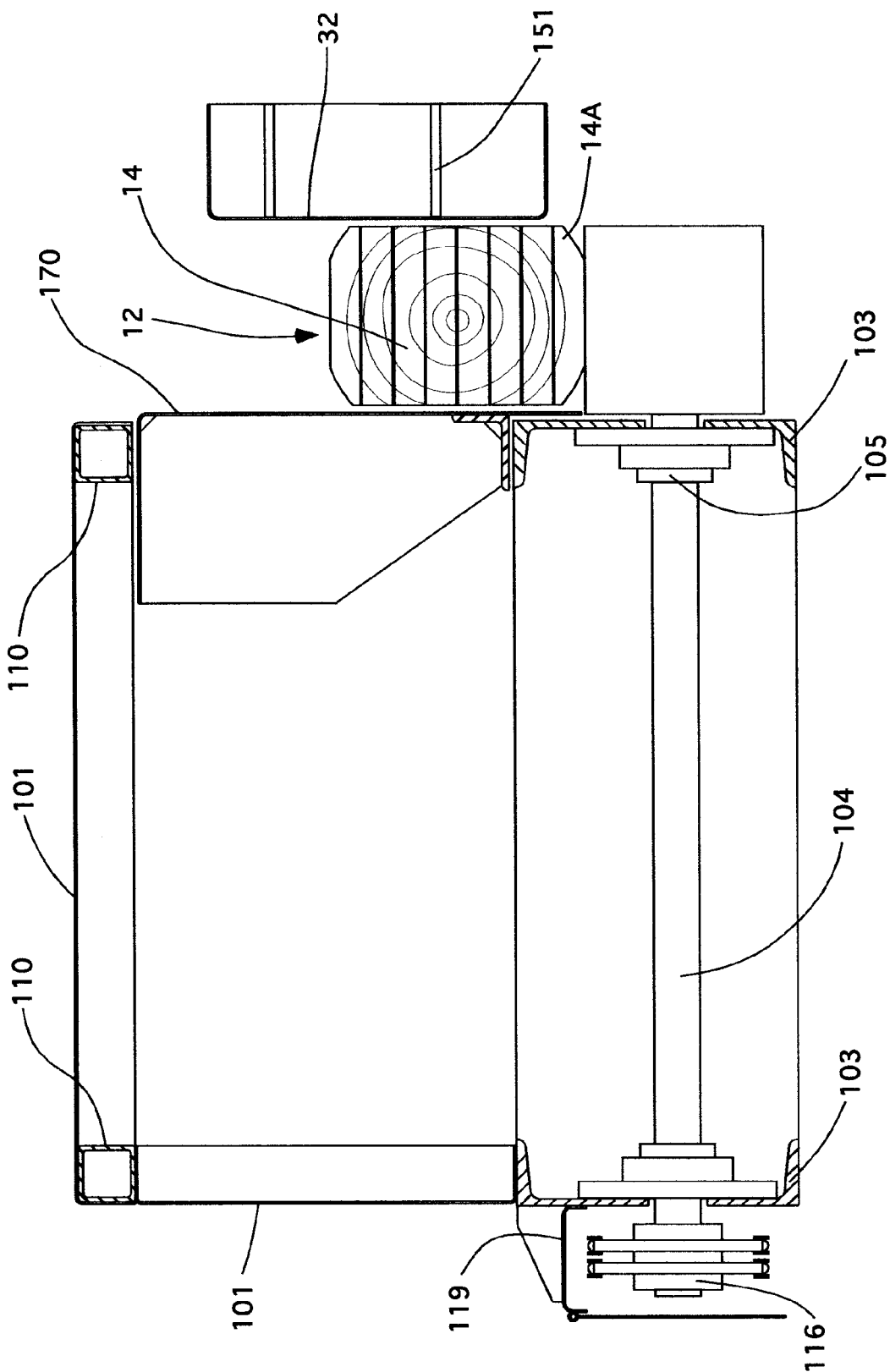
Figure 7:
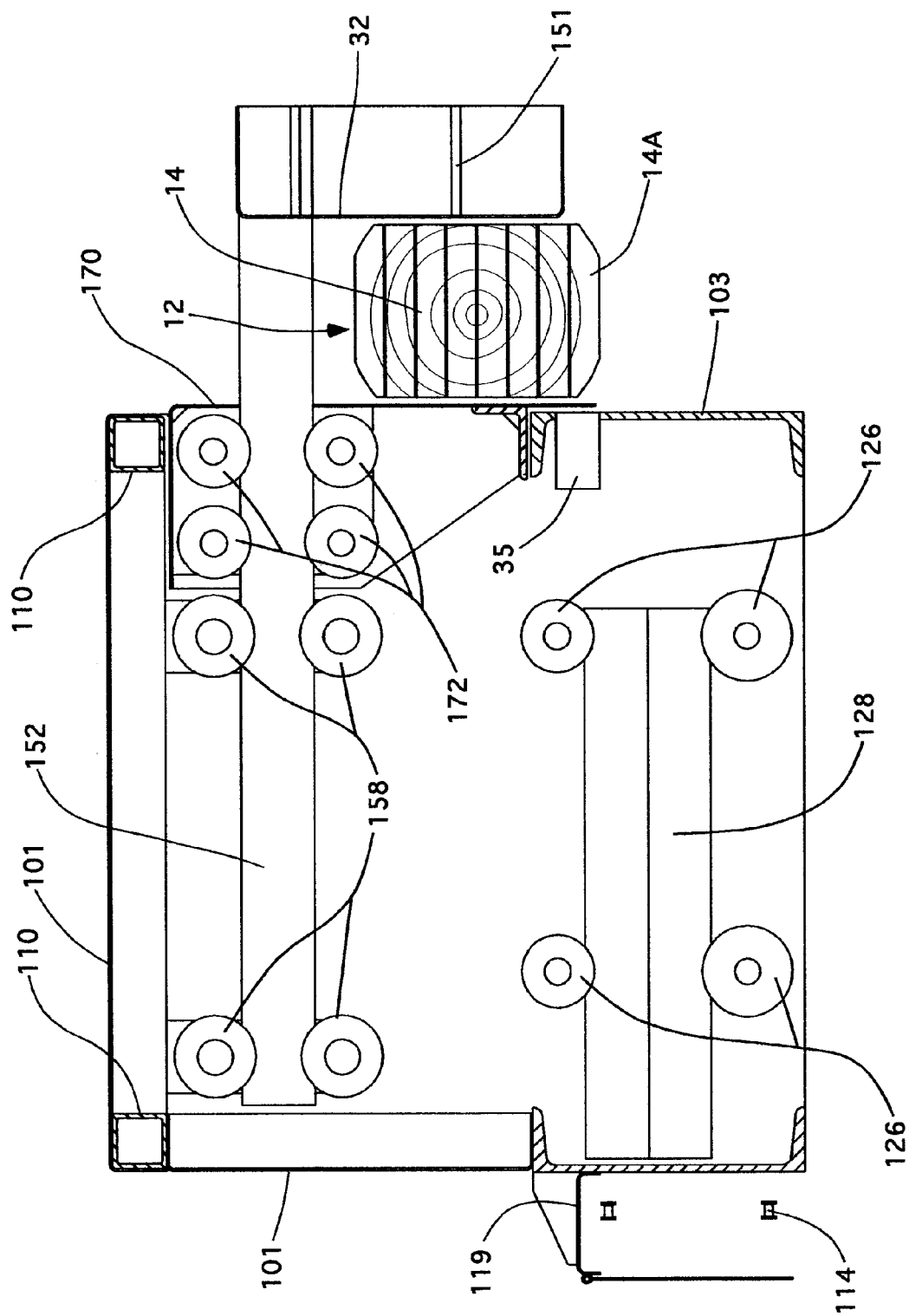
Figure 8:
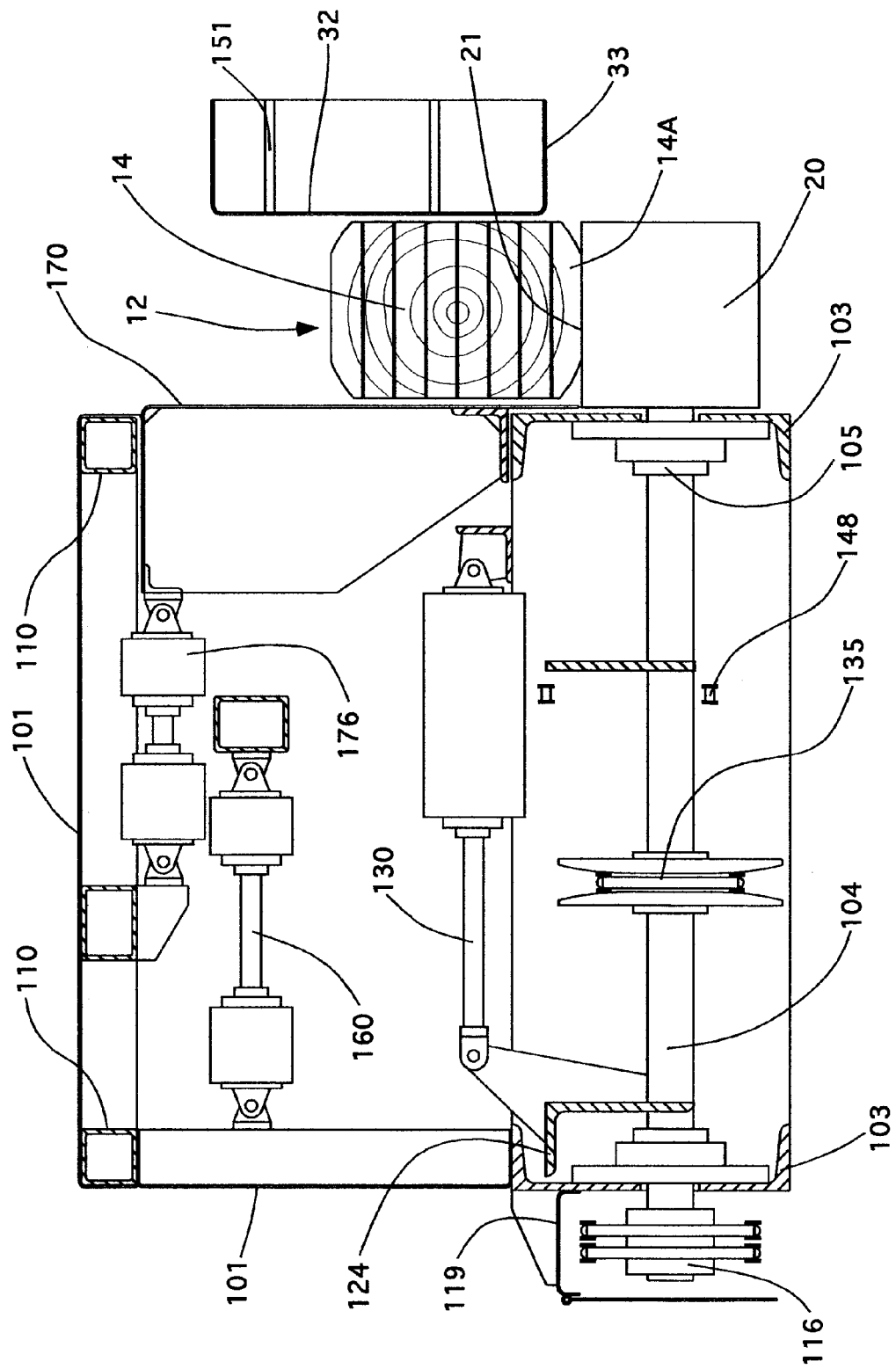
Figure 9:
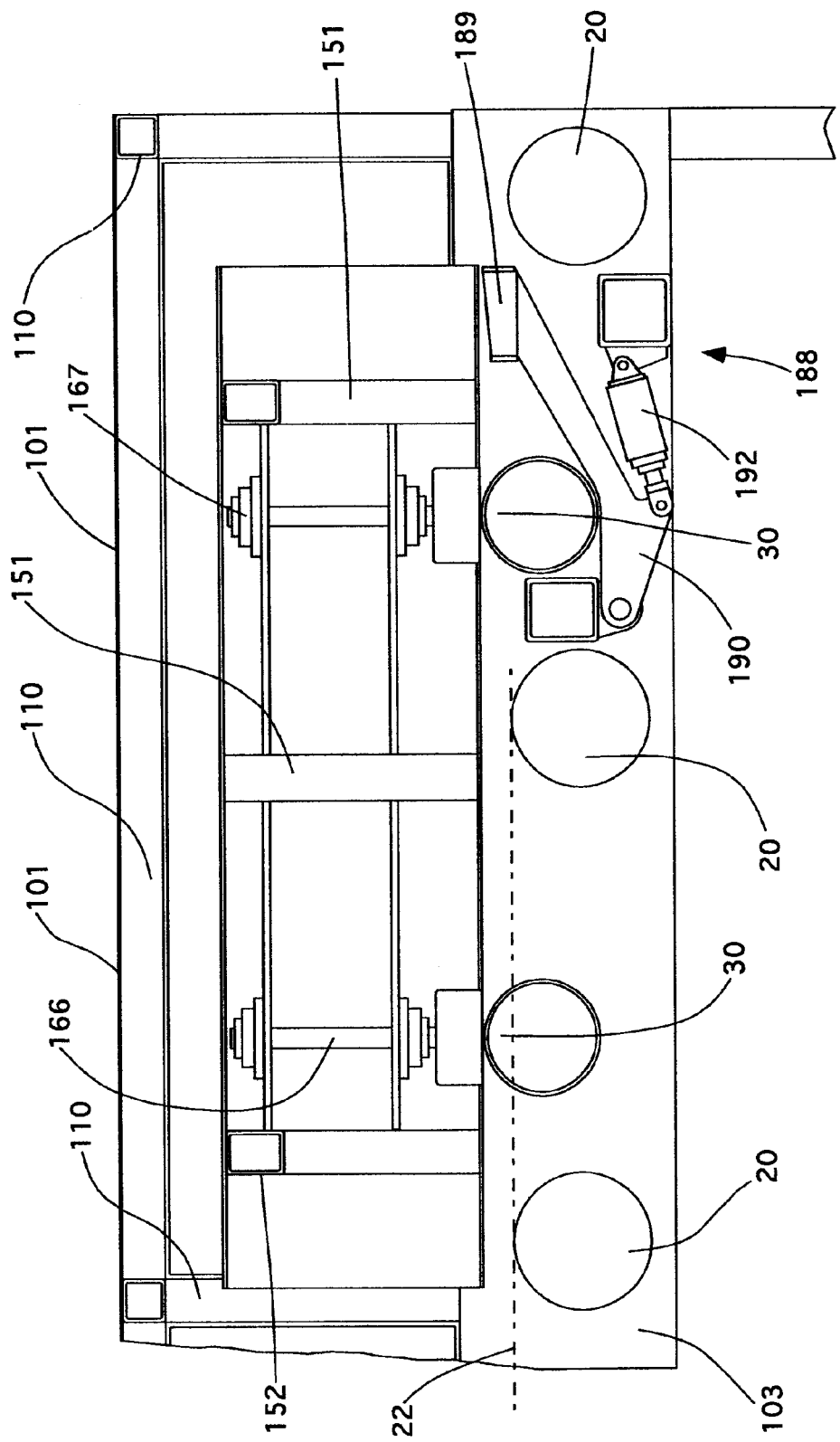
Figure 10:
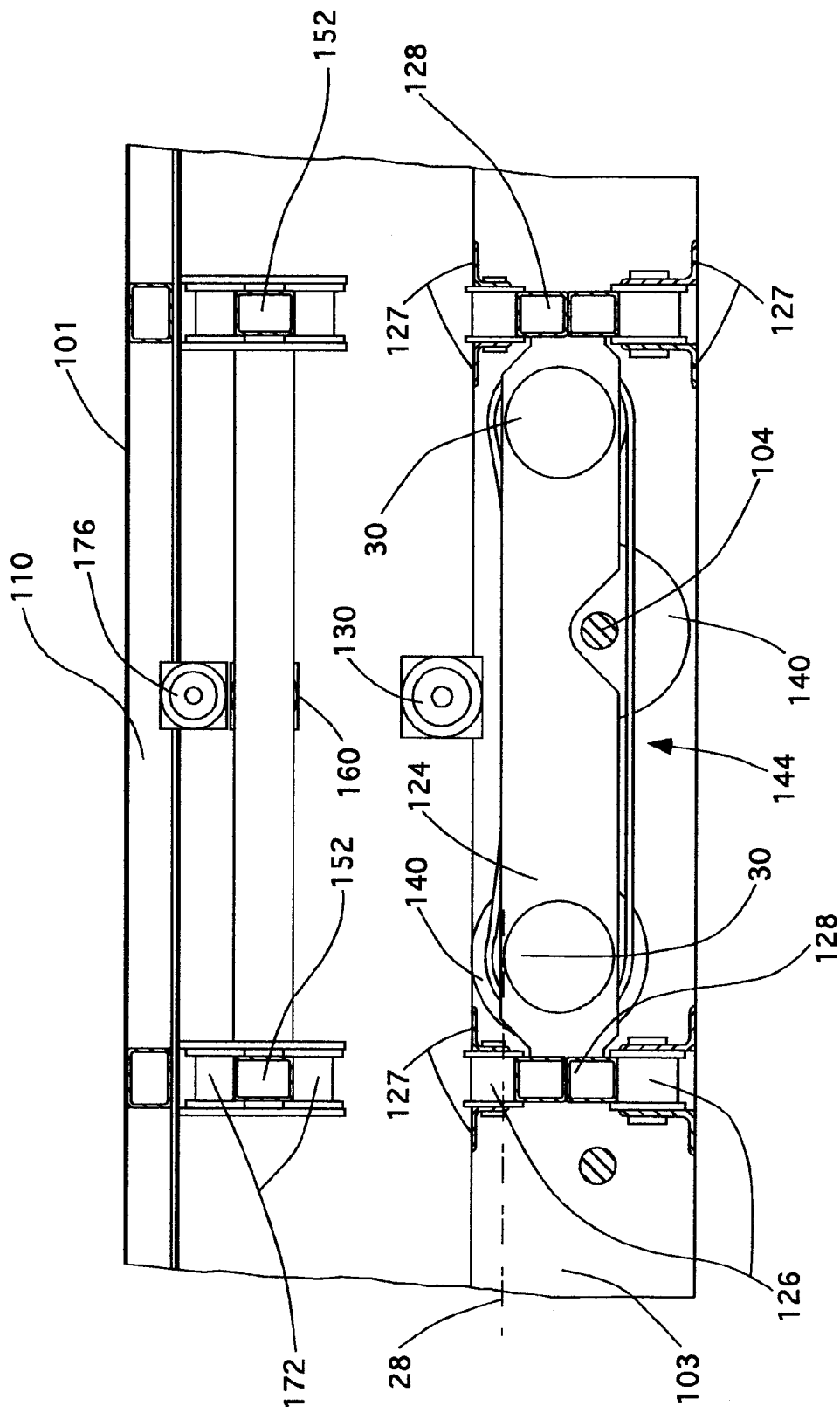
Figure 11:
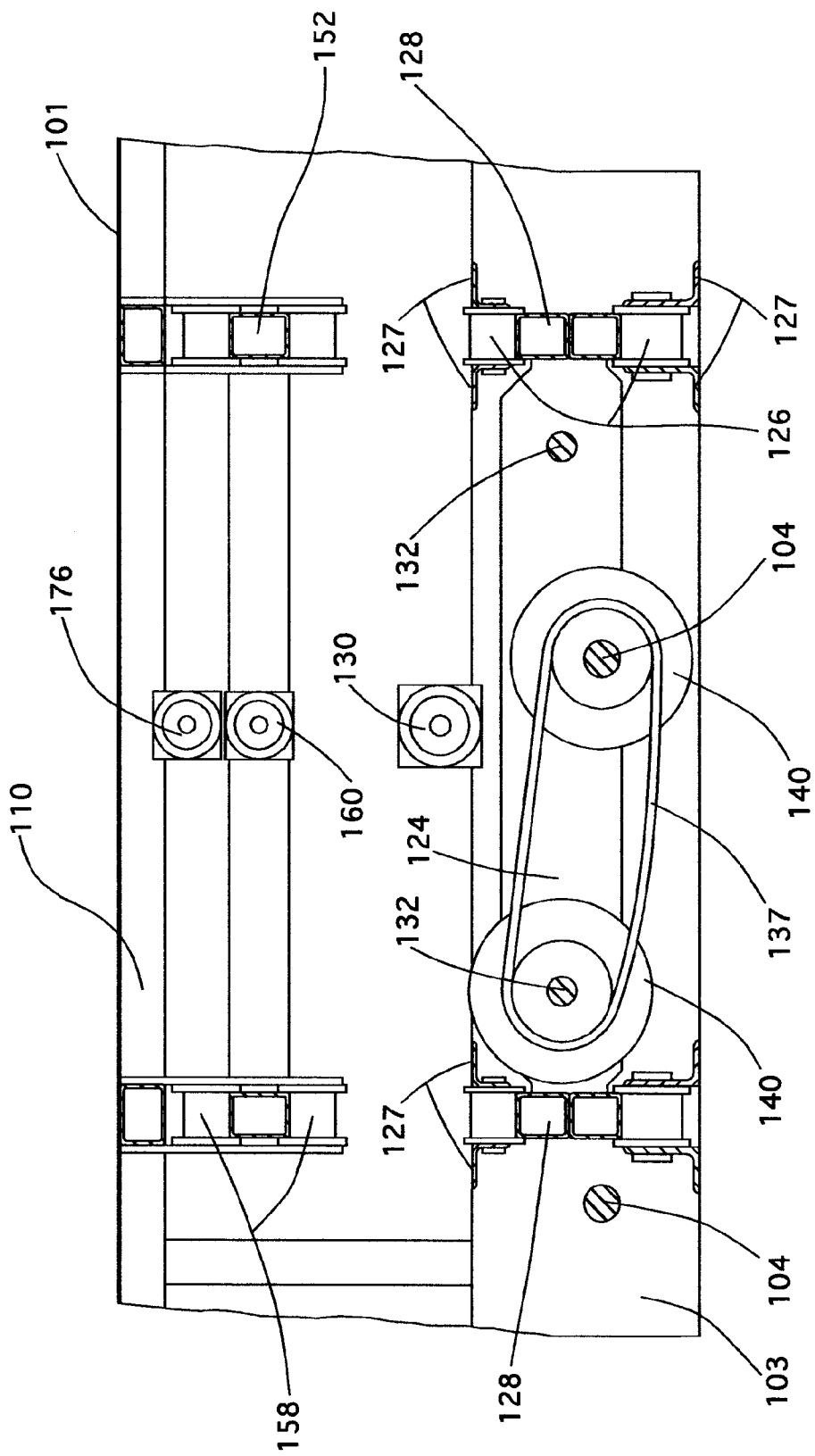
Figure 12A:
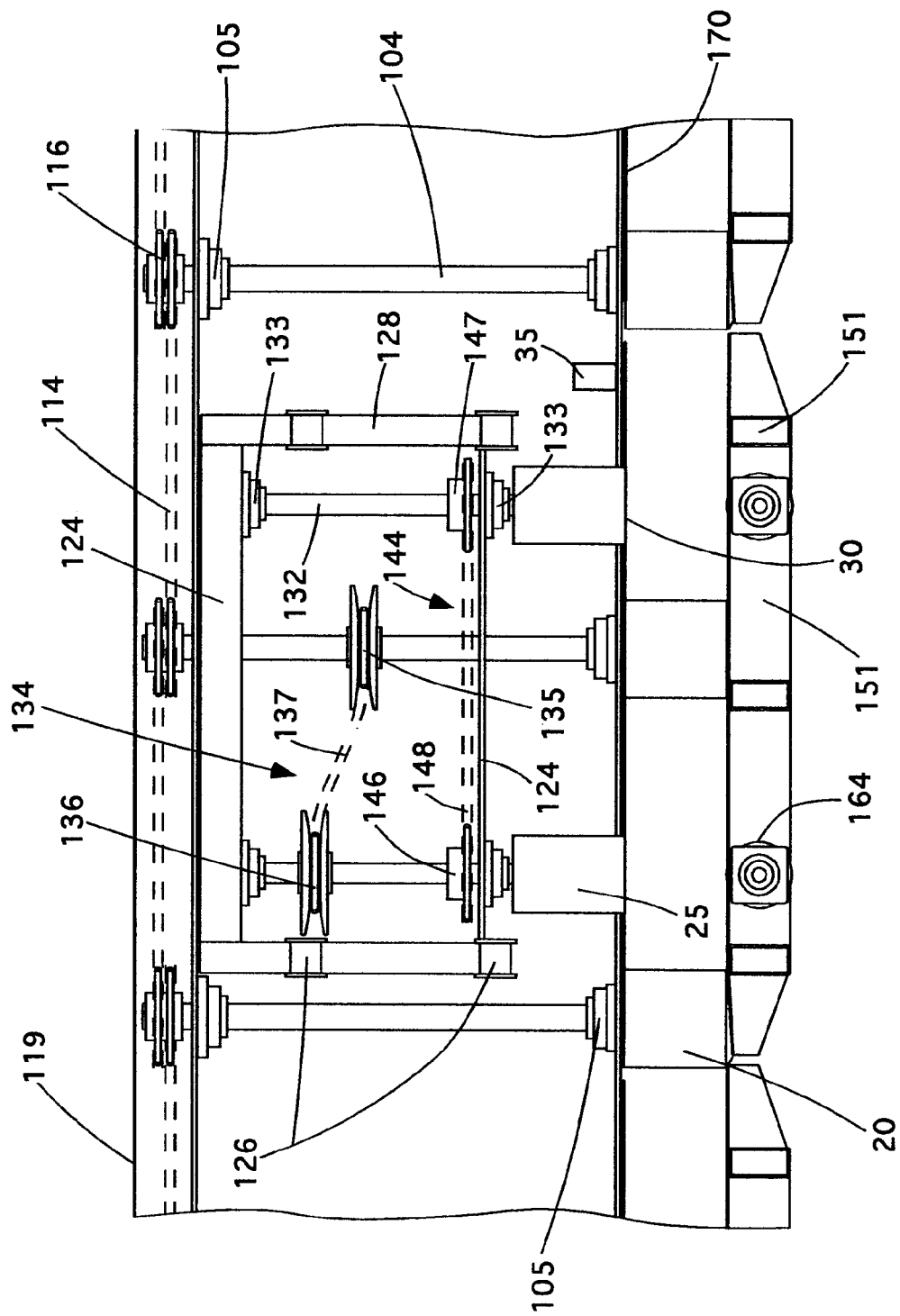
FIG. 12A is a top plan view of one segment of the particular bottom board separator with the separating rolls retracted and FIG. 12B is a top plan view of one segment of the particular bottom board separator with the separating rolls extended.
Figure 12B:
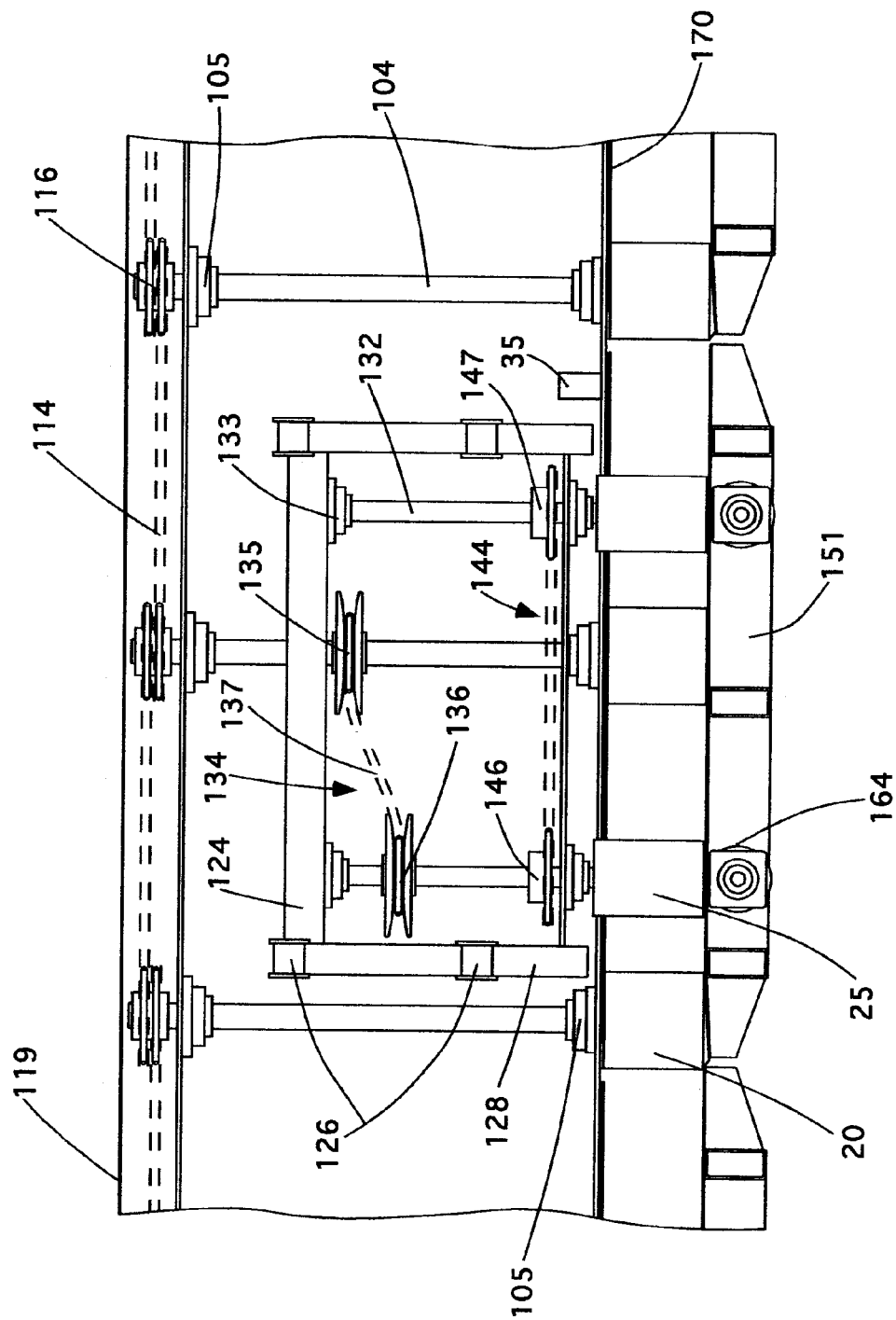

In operation, when it is desired to remove a bottom board from a stack 12 passing through bottom board separator on path 24, the arrival of the stack 12 is detected by stack detectors 35. As the stack passes into each segment 122, the inner and outer guide surfaces (170, 32) are moved together to confine the stack in the transverse direction as shown in FIG. 5A. Then rolls 25 are advanced across path 24 as shown in FIG. 5B. As they advance, the abutment surfaces of rolls 25 contact bottom board 14A and push bottom board 14A transversely out from under the rest of the stack 12. Eventually, as shown in FIG. 5C, the bottom board 14A falls onto transfer 34. At this point the weight of the remaining part of stack 12 is supported on rolls 25.

As soon as the stack 12 has passed completely through a segment 122, inner and outer guide surfaces 170, 32 are retracted away from the center of path 24 and rolls 25 are retracted out of path 24 to clear the way for the next stack 12.

Before the leading end of stack 12 reaches the location of movable stop 188, movable stop 188 is moved to its engaged position. If the bottom board 14A has not completely cleared path 24 by the time it reaches movable stop 188 then the end of the bottom board 14A hits the angled surface 189 of stop 188 and is deflected out of path 24.

Since separated boards 14A are still moving in the process direction along path 24 when they are separated, their momentum carries them until their ends hit bumper plate 186 which stops them.

Figure 13:
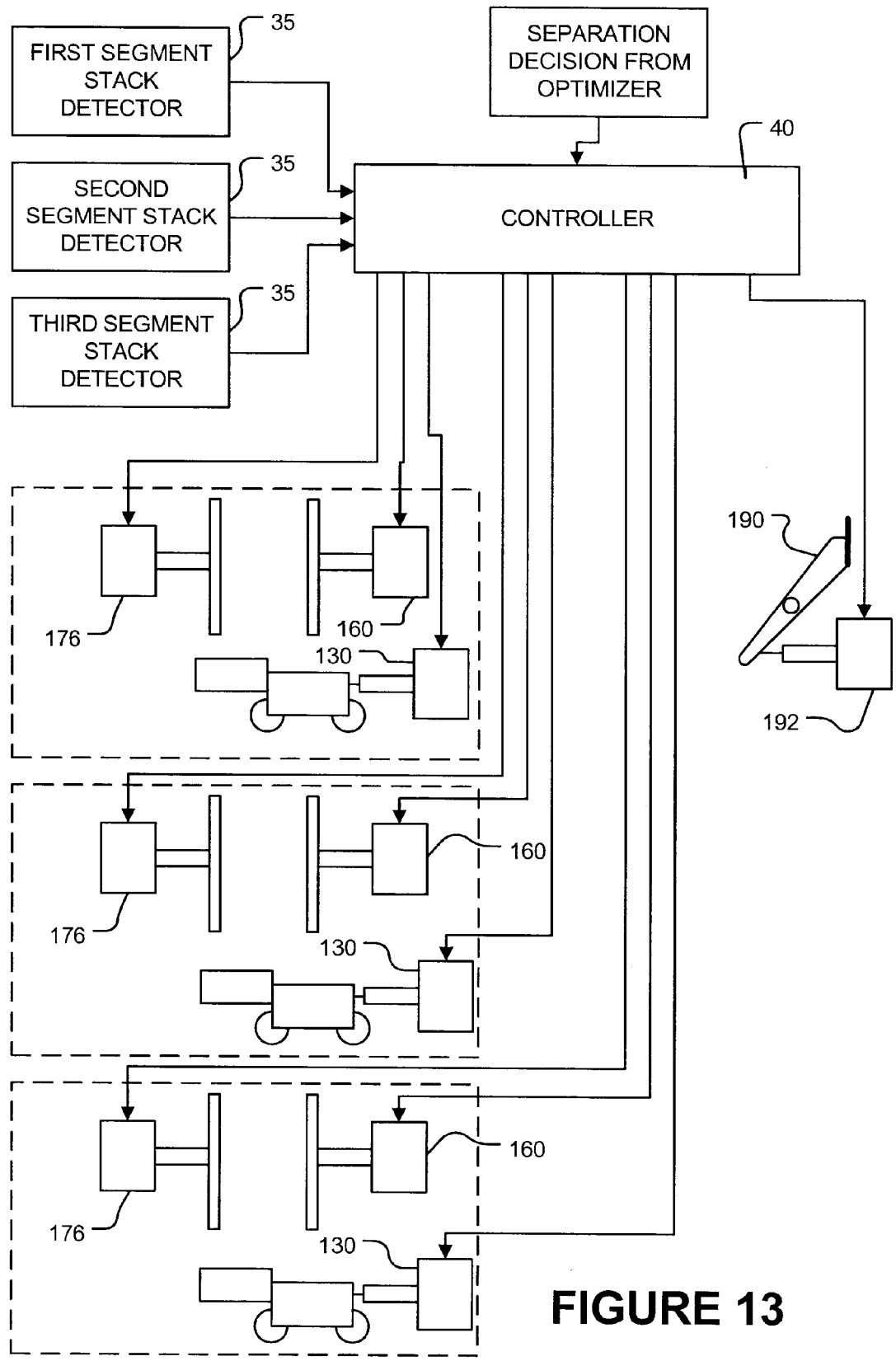

FIG. 13 shows schematically a control system for bottom board separator 10. Controller 40 comprises a data processor executing software instructions or logic circuits, or a combination thereof configured to operate the actuators of bottom board separator 10 as described herein. Controller 40 has suitable interfaces such that it can receive input signals from stack detectors 35 and other sensors that provide information about the status of bottom board separator 10 as desired and can control the operation of the various actuators of bottom board separator 10. Controller 40 may, for example, comprise a set of one or more industrial programmable controllers.

Controller 40 receives signals from an optimization system (not shown) that tells the controller 40 whether or not the bottom board ought to be separated from a particular stack 12 of lumber. If so, controller 40 operates the actuators of bottom board separator 10 to separate the bottom board. Otherwise, controller 40 lets the stack 12 simply pass through.

While a number of exemplary aspects and embodiments have been discussed above, those of skill in the art will recognize certain modifications, permutations, additions and sub-combinations thereof. For example:

In board separator 10 both inner and outer guide surfaces are movable. This is not necessary in all embodiments. One or both of the guide surfaces may be fixed.

Other suitable mechanisms may be provided for driving rolls 25. For example, separate motors could be provided to drive each roll 25 (although this would not be cost effective in many cases) or rolls 25 could be driven by transmissions that include splined shafts, gears, and the like instead of by way of chain drives.

Other suitable mechanisms may be provided for moving rolls 25 between their retracted and extended positions.

Stack conveyors are not necessarily rollers. Stack conveyors may comprise short sections of moving conveyor belt, for example.

It is therefore intended that the following appended claims and claims hereafter introduced are interpreted to include all such modifications, permutations, additions and sub-combinations as are within their true spirit and scope.

In a specific embodiment of the invention, the functions of the first and second rollcases are combined in a single rollcase that has a first board-carrying surface at a first level (at datum level 22) for supporting the bottom of a stack of lumber and a second board-carrying surface at a second level that is above datum level 22 for supporting the remainder of a stack of lumber from which the bottom board has been removed. The second level is higher than datum level 22 by a vertical distance that is approximately equal to a thickness of bottom board 14A.

Figure 14A:
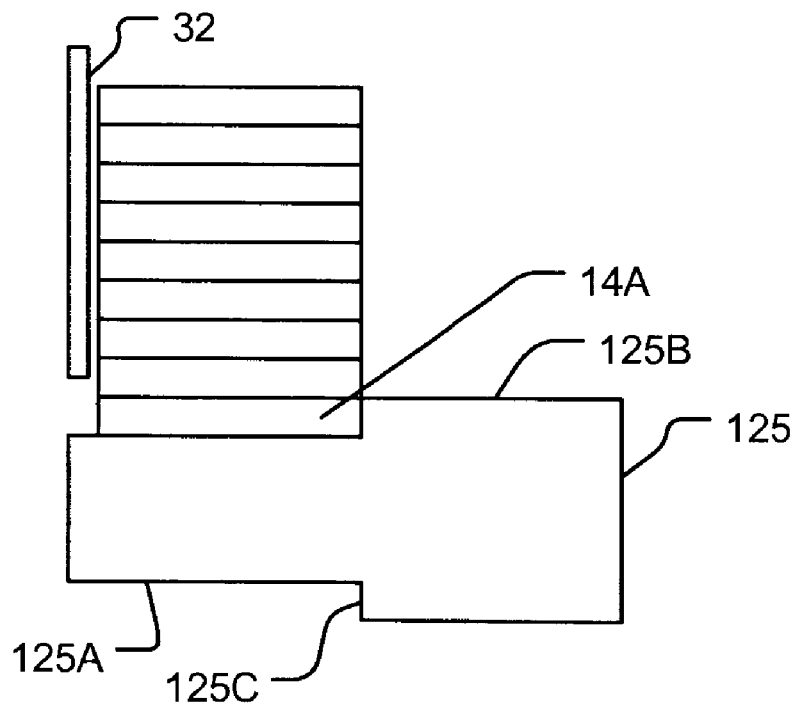
FIGS. 14A and 14B are schematic cross section views of a bottom board separator according to an alternative embodiment.
Figure 14B:
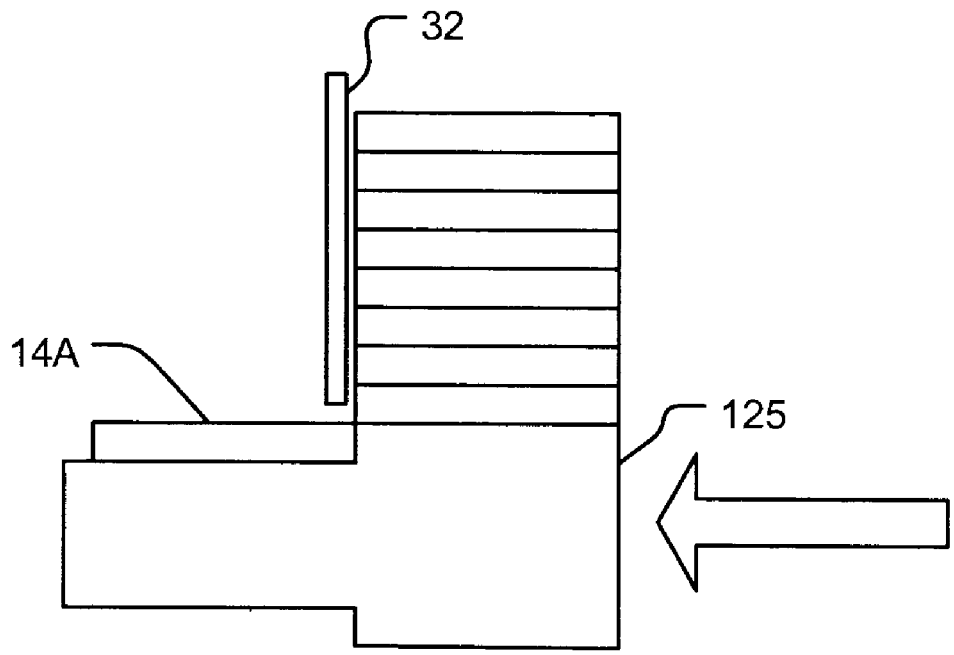

In some embodiments, the first and second levels are provided by stepped rollers as shown for example in FIGS. 14A and 14B. Each stepped roller 125 has a smaller-diameter part 125A and a larger-diameter part 125B separated by a step 125C. Step 125C has a height that is substantially equal to the thickness of bottom board 14A. Larger diameter part 125B has a diameter that is greater than a diameter of smaller-diameter part 125A by an amount approximately equal to twice the thickness of bottom board 14A.

As illustrated in FIG. 14B, moving rollers 125 sideways toward guide surface 32 causes steps 125C to abuttingly engage the edge of a bottom board 14A and separate the bottom board 14A from the overlying boards in the stack by pushing the bottom board 14A underneath guide surface 32. Rollers 125 may be driven toward guide surface 32 by any suitable actuator or combination of actuators.

In some embodiments all parts of rollers 125 rotate at the same angular rate. This is not ideal because the speeds at which top surfaces of smaller-diameter parts 125A move will be lower than the speeds at which top surfaces of larger-diameter parts 125B move. In other embodiments, smaller-diameter parts 125A and larger-diameter parts 125B are separately-driven to provide better speed matching. For example, smaller-diameter parts 125A may be driven by a shaft that projects through and may be coaxial with larger-diameter parts 125B. In some embodiments, a transmission is connected so that rotation of larger-diameter parts 125B drives smaller-diameter parts 125A or vice-versa.

It is therefore intended that the following appended claims and claims hereafter introduced are interpreted to include all such modifications, permutations, additions and sub-combinations as are within their true spirit and scope.

What is claimed is:

1. Apparatus for separating a bottom board from a moving stack of boards, the apparatus comprising:
a plurality of first board conveyors having moving upper surfaces disposed to carry a stack of boards along a path, wherein the first board conveyors comprise first rollers;

wherein a drive mechanism is connected to drive the first rollers to rotate;

a plurality of second board conveyors each located in a gap between two of the first board conveyors, each of the second board conveyors having an abutment surface on one end thereof and a board-carrying surface elevated above the moving upper surfaces of the first board conveyors;

one or more actuators coupled to move the second board conveyors between first positions wherein the second board conveyors are outside of the path on a first side of the path and second positions wherein the second board conveyors are in the path;

wherein the second board conveyors comprise second rollers.

2. Apparatus according to claim 1 wherein the board-carrying surfaces of the second board conveyors are elevated above the moving upper surfaces of the first board conveyors by a vertical distance that is approximately equal to a thickness of one board of the stack of boards.

3. Apparatus according to claim 1 wherein the apparatus comprises a drive mechanism connected to drive the second rollers to rotate.

4. Apparatus according to claim 3 wherein the abutment surfaces are coupled to rotate with the second rollers.

5. Apparatus according to claim 4 wherein the abutment surfaces comprise end surfaces of the second rollers that extend at least substantially perpendicularly to axes of rotation of the second rollers.

6. Apparatus according to claim 3 wherein the first rollers are spaced apart from one another by a distance of at least 2 feet.

7. Apparatus according to claim 3 wherein the second rollers are cantilevered from a support frame and the one or more actuators are coupled to move the support frame toward or away from the path.

8. Apparatus according to claim 7 wherein the support frame is mounted on transversely-extending rails by means of rollers.

9. Apparatus according to claim 1 comprising means for driving the moving upper surfaces of the first and second conveyors at a process speed that exceeds 200 feet per minute.

10. Apparatus according to claim 1 wherein the one or more actuators are controlled by a controller, the apparatus comprises one or more stack sensors located to detect the presence of a stack of boards at a point on the path and the controller receives a signal from the one or more stack sensors.

11. Apparatus according to claim 10 wherein the second board conveyors are distributed among a plurality of individually-controllable segments, wherein the one or more actuators comprise at least one actuator coupled to move each of the segments, the segments movable independently of other segments to carry associated second board conveyors from the second positions to the first positions under control of the controller.

12. Apparatus according to claim 11 wherein the one or more stack sensors include a stack sensor located to detect when a stack of boards has left one of the segments and the controller is configured to move the second conveyors of the segment from the second position to the first position in response to the stack sensor detecting that a stack of boards has left the segment.

13. Apparatus according to claim 1 comprising a movable end stop having an angled board-deflecting surface, the movable end stop located downstream from at least some of the second conveyors and being movable between an engaged position wherein the movable end stop projects above the moving upper surfaces of the first board conveyors but is no higher than the board carrying surfaces of the second board conveyors.

14. Apparatus according to claim 1 comprising a stack support wall having a lower edge spaced above the moving upper surfaces of the first board conveyors.

15. Apparatus according to claim 14 wherein the stack support wall comprises a plurality of rollers that are rotatable about substantially upright axes.

16. Apparatus for separating a bottom board from a moving stack of boards, the apparatus comprising:

a plurality of board conveyors that provide a moving first board-carrying surface at a datum level for supporting the bottoms of stacks of lumber and a second board-carrying surface at a second level that is higher than the datum level for supporting the remainder of a stack of lumber from which a bottom board has been removed;

a guide having a lower edge spaced above the datum level;

an abutment surface; and, a mechanism for advancing the abutment surface and the second board-carrying surface toward the guide surface to drive a bottom board of a passing stack of boards under the guide;

wherein the second board-carrying surface comprises board-carrying surfaces of second rollers, the abutment surface comprises abutment faces on the second rollers and the mechanism is configured to move the second rollers perpendicular to a board-conveying direction.

17. A method for removing a bottom board from a moving stack of boards, the method comprising:

moving the stack of boards along a path defined by a plurality of first board conveyors;

while the stack is supported by the first board conveyors, advancing abutment surfaces transversely across the path to engage and push a bottom one of the boards out from under the stack; and in gaps between the first board conveyors, advancing second board conveyors to support a remaining part of the stack;

wherein the second board conveyors comprise second rollers, the abutment surfaces are on ends of the second rollers, and advancing the abutment surfaces comprises moving the second rollers perpendicular to the path.

18. A method according to claim 17 comprising, after the stack has passed a first one of the second board conveyors, retracting the second board conveyor while allowing a second one of the second board conveyors downstream from the first one of the second board conveyors to continue to support the stack.

* * * * *